United States Patent
Skeem et al.

(10) Patent No.: US 10,915,376 B2
(45) Date of Patent: Feb. 9, 2021

(54) SYSTEMS AND METHODS FOR INCREASING EFFICIENCY OF APPLICATION PROGRAMMING INTERFACE CALLS

(71) Applicant: Smartsheet Inc., Bellevue, WA (US)

(72) Inventors: Kyan Duane Skeem, Carnation, WA (US); Paulo Henrique Cavalcante Lisboa, Sammamish, WA (US)

(73) Assignee: Smartsheet Inc., Bellevue, WA (US)

( * ) Notice: Subject to any disclaimer, the term of this patent is extended or adjusted under 35 U.S.C. 154(b) by 898 days.

(21) Appl. No.: 15/480,810

(22) Filed: Apr. 6, 2017

(65) Prior Publication Data

US 2018/0293115 A1 Oct. 11, 2018

(51) Int. Cl.
| | |
|---|---|
| G06F 16/25 | (2019.01) |
| G06F 9/54 | (2006.01) |
| G06F 21/33 | (2013.01) |
| G06F 21/62 | (2013.01) |
| G06F 16/2455 | (2019.01) |

(52) U.S. Cl.
CPC .......... *G06F 9/54* (2013.01); *G06F 16/24564* (2019.01); *G06F 16/252* (2019.01); *G06F 21/33* (2013.01); *G06F 21/6227* (2013.01)

(58) Field of Classification Search
CPC .... G06F 16/24564; G06F 16/252; G06F 9/54; G06F 21/33; G06F 21/6227; G06F 16/23–252
USPC ....................................................... 707/785
See application file for complete search history.

(56) References Cited

U.S. PATENT DOCUMENTS

| | | | | |
|---|---|---|---|---|
| 8,307,003 | B1 * | 11/2012 | Sheth ................ | G06F 16/958 707/790 |
| 2003/0151633 | A1 * | 8/2003 | George ............... | G06F 16/252 715/864 |
| 2007/0240203 | A1 * | 10/2007 | Beck .................. | G06F 21/33 726/4 |
| 2010/0192067 | A1 * | 7/2010 | Casalaina ........... | G06F 16/254 715/742 |
| 2016/0217169 | A1 * | 7/2016 | Elias ................... | G06F 21/6227 |

OTHER PUBLICATIONS

"API Requests Limits," Salesforce.com, Inc., San Francisco, Summer 2017, Version 40.0, 3 pages.

* cited by examiner

*Primary Examiner* — Robert W Beausoliel, Jr.
*Assistant Examiner* — Nirav K Khakhar
(74) *Attorney, Agent, or Firm* — Christensen O'Connor Johnson Kindness PLLC (57) ABSTRACT

Systems and methods are provided for improving communication between a multi-user data service (such as Smartsheet) and a third-party data source (such as Salesforce). The multi-user data service requests object updates from the third-party data source via an application programming interface (API). A superconnector uses superuser credentials to check for updates to a given object via the API. If updates are found, then a plurality of user connectors use user credentials to retrieve the updates via the API. If no updates are found, then user connector queries are avoided. The avoidance of the user connector queries conserves bandwidth and processor time, and also reduces the likelihood of violating an API rate limit.

20 Claims, 5 Drawing Sheets

SYSTEMS AND METHODS FOR INCREASING EFFICIENCY OF APPLICATION PROGRAMMING INTERFACE CALLS

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, a computer-implemented method of reducing a number of queries transmitted to an application programming interface (API) of a third-party data source is provided. A computing device transmits a first query to the API to request updated object records for an object, wherein the first query uses first user credentials. The computing device receives a first set of updated object records from the third-party data source in response to the first query. In response to determining that the set of updated object records is empty, the computing device refrains from transmitting further queries to the API. In response to determining that the set of updated object records is not empty, the computing device transmits a second query to the API to request updated object records for the object, wherein the second query uses second user credentials; and receives a second set of updated object records from the third-party data source in response to the second query.

In some embodiments, a system for providing a multi-user data service that accesses data from a third-party data source is provided. The system comprises at least one computing device configured to provide a plurality of user connectors and at least one superconnector. Each user connector of the plurality of user connectors is associated with at least an object accessible via an application programming interface (API) of a third-party data source and user credentials for accessing the API. The at least one superconnector is associated with at least an object accessible via the API and superuser credentials for accessing the API. The at least one superconnector is configured to transmit a request for updated object records related to the object to the API using the superuser credentials; and, in response to receiving updated object records from the API in response to the request, instruct the user connector to transmit a request for updated object records related to the object to the API using the user credentials associated with the user connector for each user connector of the plurality of user connectors that is associated with the object.

In some embodiments, a nontransitory computer-readable medium is provided. The computer-readable medium has computer-executable instructions stored thereon that, in response to execution by one or more processors of a computing device, cause the computing device to perform actions for reducing a number of queries transmitted to an application programming interface (API) of a third-party data source. The actions comprise transmitting, by the computing device, a first query to the API to request updated object records for an object, wherein the first query uses first user credentials; receiving, by the computing device, a first set of updated object records from the third-party data source in response to the first query; in response to determining that the set of updated object records is empty, refraining, by the computing device, from transmitting further queries to the API; and in response to determining that the set of updated object records is not empty, transmitting, by the computing device, a second query to the API to request updated object records for the object, wherein the second query uses second user credentials, and receiving, by the computing device, a second set of updated object records from the third-party data source in response to the second query.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

It is common for computing devices to communicate via remote application programming interfaces, or "APIs." In general, an API is provided by a first computing device, and receives requests from a second computing device. The API may then cause the first computing device to perform some processing and/or retrieve some information, and may also transmit information to the second computing device in response to the request. It is increasingly common for server computing devices that provide web services to communicate with each other via APIs in order to share information. Many different types of technology may be used to implement an API, including but not limited to Simple Object Access Protocol (SOAP), Representational state transfer (REST, or RESTful Web services), XML-RPC, JSON-RPC, CometD, and Bayeux Protocol. Because the general use of these technologies is well known to those of ordinary skill in the art, they are not further described herein for the sake of brevity.

Figure 1:
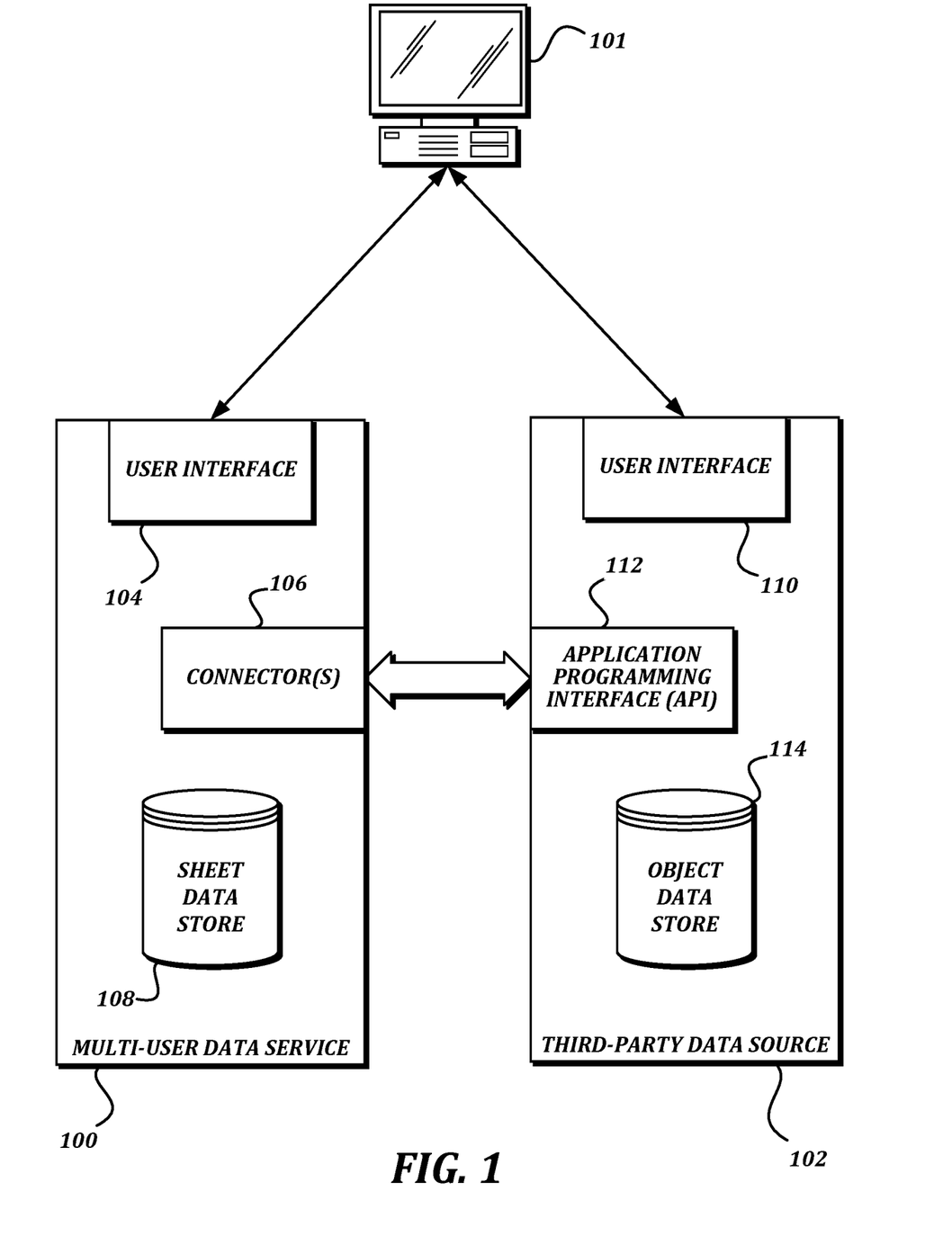
FIG. 1 is a block diagram that illustrates a non-limiting example embodiment of a system in which server computing devices exchange information using an API according to various aspects of the present disclosure.

FIG. 1 is a block diagram that illustrates a non-limiting example embodiment of a system in which server computing devices exchange information using an API according to various aspects of the present disclosure. In the system, a multi-user data service 100 communicates with a third-party data source 102.

The multi-user data service 100 is provided by one or more server computing devices, and may be accessed via a network such as the Internet. Though not illustrated, one of ordinary skill in the art will recognize that the server computing devices of the multi-user data service 100 are configured to perform tasks for providing the data service, including but not limited to storing data, processing data, and handling communication with other computing devices. As shown, the server computing devices of the multi-user data service 100 provide a user interface 104, one or more connectors 106, and a sheet data store 108.

The user interface 104 allows a plurality of end users to communicate with the multi-user data service 100 via a plurality of user computing devices 101 over a network. In some embodiments, the user interface 104 may be a web-based interface generated by the multi-user data service 100 and rendered by the user computing device 101. In some embodiments, the user interface 104 may include an API provided by the multi-user data service 100 that is accessed by a program executing on the user computing device 101 in order to provide a graphical user interface to the user. The connectors 106 include executable instructions and data that are usable to request information from the third-party data source 102. The connectors 106 are described in detail further below. The sheet data store 108 stores information that is accessed via the user interface 104. Though labeled a "sheet" data store, in some embodiments, the sheet data store 108 may be configured to store any type of data.

The third-party data source 102 is also provided by one or more server computing devices, and may be accessed via a network such as the Internet. As with the multi-user data service 100, one of ordinary skill in the art will recognize that the server computing devices of the third-party data source 102 are configured to perform tasks for providing the data source, including but not limited to storing data, processing data, and handling communication with other computing devices. As shown, the server computing devices of the third-party data source 102 provide a user interface 110, an application programming interface (API) 112, and an object data store 114.

In some embodiments, the user interface 110 allows the plurality of end users to communicate with the third-party data source 102 via the plurality of user computing devices 101 over a network. In some embodiments, the user interface 110 may be a web-based interface generated by the third-party data source 102 and rendered by the user computing device 101. In some embodiments, the user interface 110 may include an un-illustrated API provided by the third-party data source 102 that is accessed by a program executing on the user computing device 101 in order to provide a graphical user interface to the user. In some embodiments, the third-party data source 102 may not provide a user interface 110 that is directly accessible to the user via a user computing device 101, but may instead require that the user access the third-party data source 102 by interacting with the multi-user data service 100. The API 112 provides programmatic access via a network to object information stored in the object data store 114.

As understood by one of ordinary skill in the art, a "data store" as described herein may be any suitable device configured to store data for access by a computing device. One example of a data store suitable for use with the high capacity needs of the multi-user data service 100 or the third-party data source 102 is a highly reliable, high-speed relational database management system (RDBMS) executing on one or more computing devices and accessible over a high-speed network. However, any other suitable storage technique and/or device capable of quickly and reliably providing the stored data in response to queries may be used, such as a key-value store, an object database, and/or the like. Further, for the multi-user data service 100 or the third-party data source 102, the computing device providing the data store may be accessible locally instead of over a network, or may be provided as a cloud-based service. A data store may also include data stored in an organized manner on a computer-readable storage medium, as described further below. One of ordinary skill in the art will recognize that separate data stores described herein may be combined into a single data store, and/or a single data store described herein may be separated into multiple data stores, without departing from the scope of the present disclosure.

One non-limiting example of a multi-user data service 100 is a web-based service that allows users to create, store, manage, and share data organized into tables or "sheets." One such service is Smartsheet, provided by Smartsheet Inc. Other examples of similar services include, but are not limited to, Google Sheets and Quip. In some embodiments, other types of multi-user data services 100 that provide service to a plurality of users and connect to a third-party data source 102 may be used. Any server-based system that provides access to objects via an API may be used as a third-party data source 102. One non-limiting example of a third-party data source 102 is provided by Salesforce.com, Inc. Salesforce provides a cloud-computing platform for customer relationship management (CRM) that is accessible by a set of APIs. The CRM information in Salesforce is stored in a set of objects.

In the particular example that uses Smartsheet as the multi-user data service 100 and Salesforce as the third-party data source 102, Smartsheet provides connectors that allow information from Salesforce objects to be synchronized to sheets in Smartsheet via the Salesforce API. Typically, a company will create a master account in Smartsheet, and an organization (or "org") in Salesforce. Within this master account in Smartsheet, multiple user accounts will also be created. Within the Salesforce org, corresponding user accounts will also be created. Smartsheet and Salesforce operate at arm's length and do not share security information. As such, Smartsheet handles user permissions for accessing information within Smartsheet, and Salesforce separately handles user permissions for accessing information within Salesforce. This non-limiting example is a typical way that user permissions and accounts will be configured within a multi-user data service 100 and a third-party data source 102.

Typically, the third-party data source 102 will place a limit on the number of requests that may be submitted to the API 112 in a given period. These limits are often enforced on a per-subscription basis by the use of an API key. Once this limit is reached for a given API key, further requests during the period will be locked out, until the next period. These limits are imposed by the third-party data source 102 in order to prevent any given user from consuming a disproportionate share of the computing resources at the third-party data source 102. In some embodiments, the third-party data source 102 may further control access to its computing resources by providing different tiers of service for different costs, and may allow more API queries in a given period for users who pay for a higher tier of service than a lower tier of service.

Due to these limits, a technical problem exists in that only a limited number of queries are allowed from the multi-user data service 100 to the API 112. In the non-limiting example of Salesforce described above, users in a given Salesforce org will normally all access the API 112 using the same API key. If a large number of users are supported by the multi-user data service 100, and each user may create one or more connectors 106 that each perform their own queries to the API 112, the query limits may be reached fairly rapidly (as discussed further below). It would be desirable to reduce the number of queries to the API 112 in order to avoid reaching the query limits. While simply increasing a polling interval between which queries are transmitted would reduce the overall number of queries, this has the deleterious effect of reducing the level of synchronicity of data between the multi-user data service 100 and the third-party data source 102, in that users would have to wait longer for changes made to the data in the third-party data source 102 to be reflected in the multi-user data service 100. Aside from the query limits, further technical problems exist in that each query from the multi-user data service 100 to the API 112 consumes network bandwidth and computing resources at the third-party data source 102. It would be desirable to minimize the consumption of bandwidth and computing resources at the third-party data source 102, while nevertheless maintaining a high level of synchronization between the multi-user data service 100 and the third-party data source 102.

Figure 2:
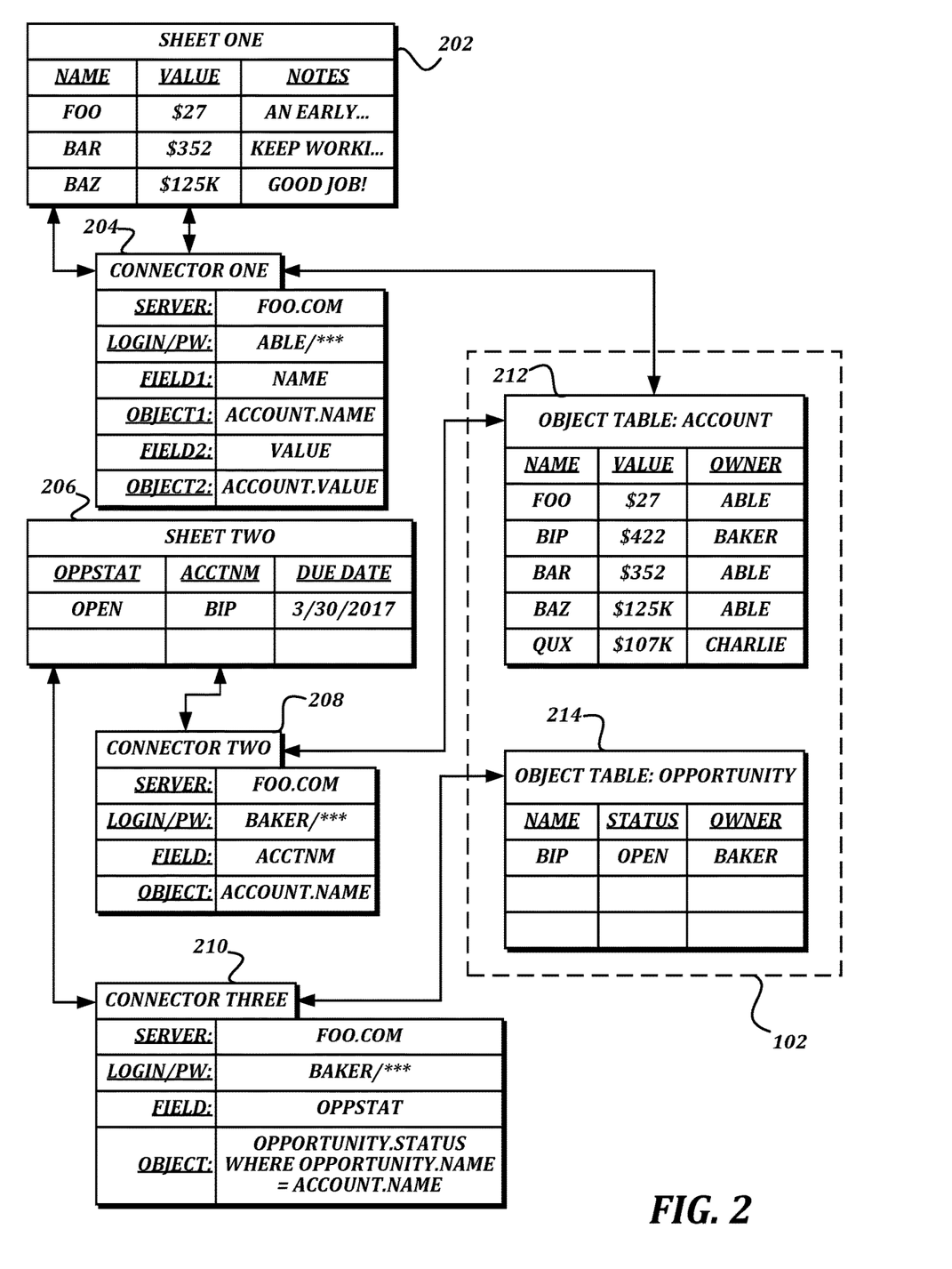
FIG. 2 illustrates a non-limiting example of data synchronization between the multi-user data service and the third-party data source illustrated in FIG. 1.

FIG. 2 illustrates a non-limiting example of data synchronization between the multi-user data service 100 and the third-party data source 102 illustrated in FIG. 1. As shown, the multi-user data service 100 stores tabular data in its sheet data store 108. The tabular data includes a plurality of sheets that includes sheets 202 and 206. Each sheet includes one or more rows, and each row includes one or more columns. The intersection of a row and a column may be referred to as a cell. For example, sheet one 202 includes three columns ("name," "value," and "notes"), as well as three rows. As another example, sheet two 206 includes three different columns ("oppstat," "acctnm," and "due date"), as well as two rows. In some embodiments, the rows, columns, and sheets stored by the multi-user data service 100 are user-configurable. As such, the illustrated rows, columns, and sheets are examples only, and embodiments may include more, fewer, and/or different rows, columns, and/or sheets.

The dashed line box of FIG. 2 illustrates objects stored in the object data store 114 by the third-party data source 102. Each object is represented by a table, and instances of a given object are represented by records (or rows) in the associated table. As shown, the third-party data source 102 stores an account object table 212 and an opportunity object table 214. Each record in the account object table 212 includes fields (or columns) for "name," "value," and "owner." Each record in the opportunity object table 214 includes fields (or columns) for "name," "status," and "owner." One of ordinary skill in the art will recognize that the illustrated object data stored by the third-party data source 102 are examples only, and that other examples may include more, fewer, and/or different objects, fields, and/or records.

The connectors 106 of the multi-user data service 100 include connector one 204, connector two 208, and connector three 210. Each connector 204, 208, 210 uses queries to the API 112 to retrieve information from one or more objects at the third-party data source 102. These queries and their associated responses are illustrated by the arrows between the connectors 204, 208, 210 and the object tables 212, 214. The connectors 204, 208, 210 use the information retrieved from the object tables 212, 214 to update the sheets 202, 206, as illustrated by the arrows between the connectors 204, 206, 210 and the sheets 202, 206.

Each connector 204, 208, 210 specifies an address of a server to be used to access the API 112. The server address may be a URL, and multiple server addresses may be used by multiple connectors to contact a single third-party data source 102. The connectors 204, 208, 210 also specify data to be accessed from the third-party data source 102, and which fields from the sheets should be updated. For example, connector one 204 indicates that information from the "name" field of the account object table 212 should be synchronized to the "name" column in sheet one 202. Connectors may specify more than one column to be updated. As such, connector one 204 also indicates that information from the "value" field of the account object table 212 should be synchronized to the "value" column in sheet one 202.

In some embodiments, multiple connectors 106 may be used to update a single sheet. This may be particularly useful if information from multiple objects at the third-party data source 102 is desired in the sheet. For example, connector two 208 indicates that information from the "name" field of the account object table 212 should be synchronized to the "acctnm" column in sheet two 206, and connector three 210 indicates that information from the "status" field of the opportunity object table 214 should be synchronized to the "oppstat" column in sheet two 206. Connector three 210 also illustrates an example of a filter. In some embodiments, the filter may specify that only a subset of records in the object table should be synchronized to the sheet. One non-limiting example filter may indicate that only account records with a value greater than a threshold should be synchronized to the sheet. Another example, as illustrated in connector 210, may indicate a value used to join object information from multiple objects.

Each connector 204, 208, 210 specifies user account information such as login and password information for accessing the API 112. For example, connector one 204 uses user account information Able, while connector two 208 and connector three 210 use user account information for Baker. As described above, each user account may have access to different subsets of information within the third-party data source 102. For example, Able may only have access to the records for the account object for which he is listed as the owner. Likewise, Baker may only have access to the records for the account object and the opportunity object for which he is listed as the owner. Accordingly, separate connectors will be used for each user, even if they are accessing the same object table at the third-party data source 102. In some embodiments, if the API 112 only supports requesting information from a single object table at a time, separate connectors will also be used for each object, even for a single user.

Figure 3:
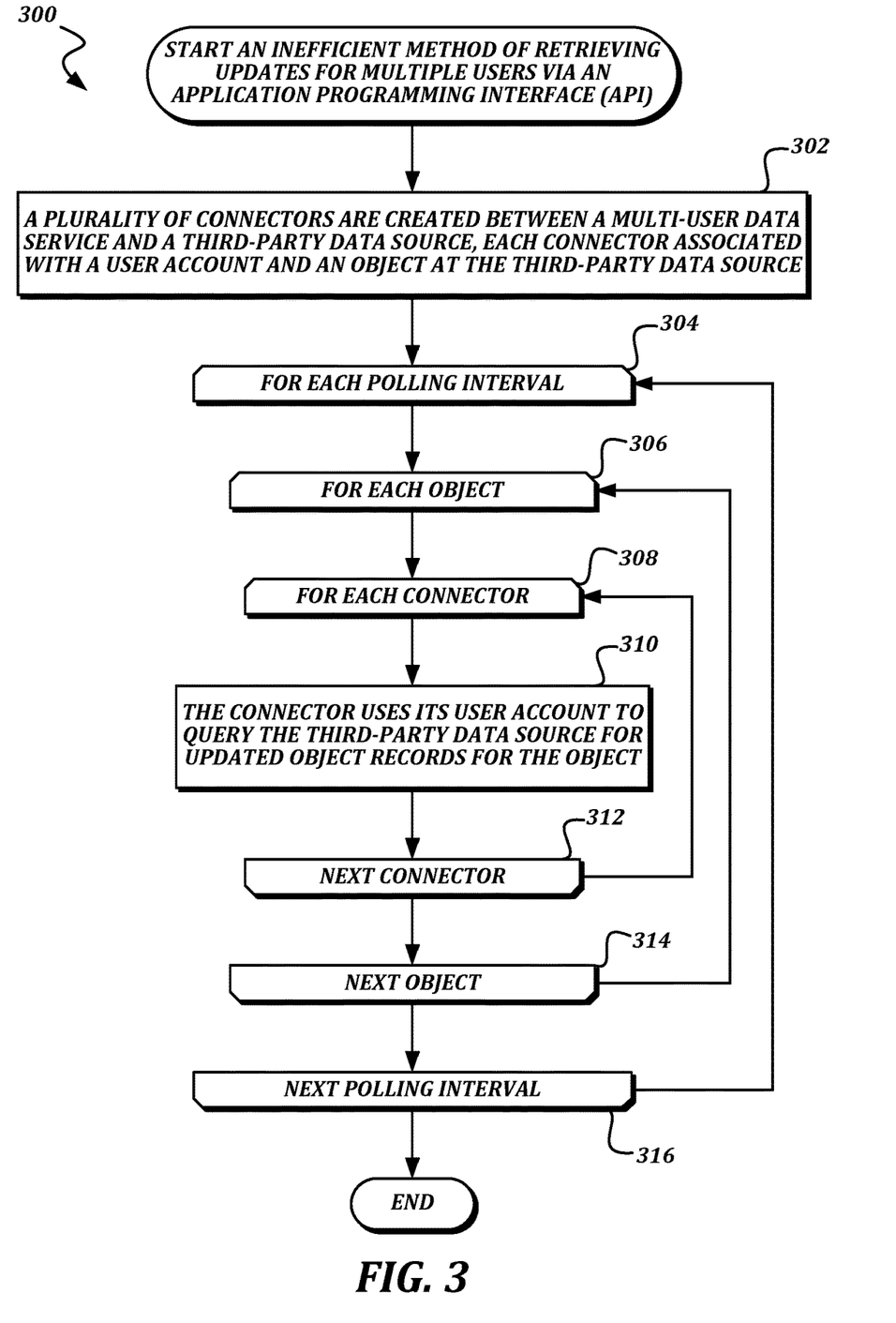
FIG. 3 is a flowchart that illustrates a conventional method of supporting the data synchronization illustrated in FIG. 2.

FIG. 3 is a flowchart that illustrates a conventional method of supporting the data synchronization illustrated in FIG. 2. Because user accounts have access to different information in the third-party data source 102, and because such access rights are managed by the third-party data source 102, the query for each connector 106 must be executed separately in order to maintain proper access control to the information from the third-party data source 102. As will be clear to one of ordinary skill in the art from the following description, the use of separate connectors for each user and object will cause this convention method to generate a large number of queries to the API 112.

From a start block, the method 300 proceeds to block 302, where a plurality of connectors 106 are created between a multi-user data service 100 and a third-party data source 102. Each connector 106 is associated with a user account and an object at the third-party data source 102. Credentials such as a login and password associated with the user account are used by the connector 106 to connect to the API 112, so that the third-party data source 102 can manage permissions on objects in the object data store 114. As stated above, the connector 106 may also be associated with a filter, a column in a sheet, and one or more fields of the object.

The method 300 then proceeds to for loop start block 304, which begins a set of nested for loops. A polling interval loop is defined between for loop start block 304 and for loop end block 316. The polling interval loop is executed once for each polling interval. The polling interval is a period of time during which the information in the multi-user data service 100 is updated by querying the third-party data source 102. The period of time may be configurable by a master user of the multi-user data service 100, and may be any suitable period of time, such as any value in the range of one second to one hour, like ten minutes. In some embodiments, the API 112 offers an endpoint that handles requests for updates to objects that occurred in a specified time frame (e.g., an endpoint that allows a connector 106 to request updates to a given object that occurred between a start time and an end time). As such, the start of the polling interval loop may be used as the start time, and the polling interval time may be used to set the end time. On a subsequent loop, the end time will be used as the new start time, and the polling interval time will be used to set the new end time.

From the for loop start block 304, the method 300 proceeds to for loop start block 306, which begins an object loop defined between for loop start block 306 and for loop end block 314. The object loop is executed once for each object to be queried on the third-party data source 102. As described above, the object loop is used because the API 112 may require that a given query only request information about a single object.

From the for loop start block 306, the method 300 proceeds to for loop start block 308, which begins a connector loop defined between for loop start block 308 and for loop end block 312. The connector loop is executed once for each connector 106. From for loop start block 308, the method 300 proceeds to block 310, where the connector 106 uses its user account to query the third-party data source 102 for updated object records of the object. The query is conducted by transmitting at least one request to the API 112 using the user account settings for the connector 106. In some embodiments, multiple queries for the user account and the object in block 310, including in cases where the API 112 paginates results. For example, if the API 112 limits results for a given query to 10 records, but 15 records have been updated within the third-party data source 102 since a previous polling interval, two queries to the API 112 may be used to retrieve all results. In response to the query (or queries), the API 112 provides any updated records for the object that satisfy the query. The connector 106 may then process the updated records to synchronize the information to the associated sheets.

After the updated object records have been received at block 310, the method 300 proceeds to the for loop end block 312. At for loop end block 312, if more connectors 106 remain to be processed for the object, the method 300 returns to for loop start block 308. Otherwise, the method 300 proceeds to for loop end block 314. At for loop end block 314, if more objects remain to be processed, the method 300 returns to for loop start block 306. Otherwise, the method 300 proceeds to for loop end block 316. The method 300 then waits for the polling interval to conclude. Upon conclusion of the polling interval, if the method 300 is to continue executing, the method 300 returns to for loop start block 304. Otherwise, the method 300 proceeds to an end block and terminates.

One can see that, if there are M objects, and it is assumed for the sake of discussion that there are N connectors for each object (though in actual embodiments, some objects may have more or fewer connectors), and it is assumed for the sake of discussion that each updated record set can be retrieved using a single query, there will be M*N queries during each polling interval. Further, while the number of objects (M) may remain relatively stable, the number of connectors (N) will grow as the number of users grows. For a multi-user data service 100 that has a modest number of users (say, 100), with each user syncing to 10 objects with one connector each, a total of 1000 queries will be generated for each polling interval. A 1-minute polling interval (which is reasonable for establishing the appearance of real-time synchronization between the multi-user data service 100 and the third-party data source 102) would generate 1,440,000 queries per day. This number of queries is likely to breach any API limits enforced by the third-party data source 102, and so it is clear that improvements to the method 300 are desired to reduce the number of queries.

Figure 4:
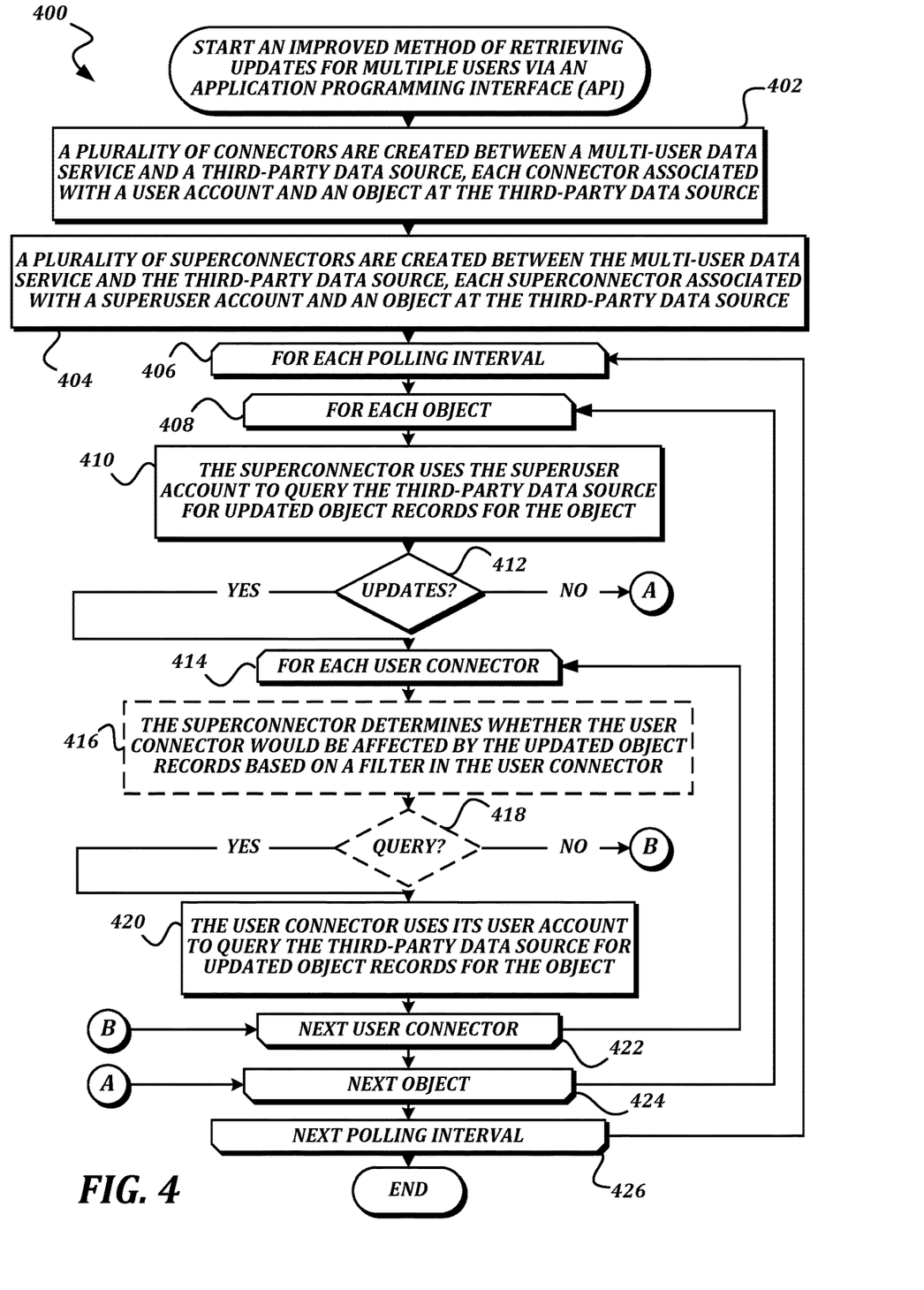
FIG. 4 is a flowchart that illustrates a non-limiting example embodiment of a method of retrieving updates for multiple users via an application programming interface according to various aspects of the present disclosure.

FIG. 4 is a flowchart that illustrates a non-limiting example embodiment of a method of retrieving updates for multiple users via an application programming interface according to various aspects of the present disclosure. As will be shown below, the method 400 is a marked improvement over the traditional method 300 described above, at least because only a minimum number of API calls are generated for each polling interval.

From a start block, the method 400 proceeds to block 402, where a plurality of connectors 106 are created between a multi-user data service 100 and a third-party data source 102, each connector 106 associated with a user account and an object at the third party data source 102. The actions in block 402 are largely similar to the actions in block 302, because the basic setup of the connectors 106 and objects at the third party data source 102 are the same in both situations. However, method 400 differs in that, from block 402, it proceeds to block 404, where a plurality of superconnectors 106 are created between the multi-user data service 100 and the third-party data source 102, each superconnector 106 associated with a superuser account and an object at the third-party data source 102. Unlike the user accounts (which each have access to a limited subset of object records for each object), the superuser account has access to all of the object records for all of the objects. Each superconnector 106 is configured to receive all updated object records for a single given object at the third-party data source 102 by using account credentials of the superuser account to access the API 112. Because the ordinary users of the multi-user data service 100 will not have access to the superuser account credentials, the multi-user data service 100 may automatically create the superconnectors 106 when a master user of the multi-user data service 100 provides the superuser account credentials upon initial configuration of a link between the multi-user data service 100 and the third-party data source 102. The superconnectors 106 are otherwise similar to the other connectors 106.

The method 400 then proceeds to a for loop start block 406, which begins a set of nested for loops. A polling interval loop is defined between for loop start block 406 and for loop end block 426. The polling interval loop is executed once for each polling interval, as described above, and is used to determine a start time and an end time for the update API requests. From the for loop start block 406, the method 400 proceeds to for loop start block 408, which begins an object loop defined between for loop start block 408 and for loop end block 424. The object loop is executed once for each object to be queried on the third-party data source 102.

From the for loop start block 408, the method 400 proceeds to block 410, where the superconnector associated with the object uses the superuser account to query the third-party data source 102 for updated object records for the object. In response, the superconnector receives updated object records, if any exist, that any user might have access to. The superconnector receives an empty result if no updated object records exist for the requested time frame. Then, method 400 proceeds to decision block 412, and a test is performed to determine whether any updated object records were returned. If updated object records were returned, then the result of the test at decision block 412 is YES, and the method 400 proceeds to for loop start block 414. Otherwise, if no updated object records were returned, then the result of the test at decision block 412 is NO, and the method 400 proceeds to a continuation terminal ("terminal A") in order to skip to the end of the object loop. One will note that by proceeding to the end of the object loop, the API queries for the connectors 106 are skipped for the object.

The for loop start block 414 begins a user connector loop defined between the for loop start block 414 and the for loop end block 422. The user connector loop is executed once for each of the user connectors 106 that refers to the object (as opposed to the superconnector 106).

From the for loop start block 414, the method 400 proceeds to optional block 416, where the superconnector 106 determines whether the user connector being processed would be affected by the updated object records based on a filter in the user connector. For example, a filter in the user connector may indicate that it should only synchronize object records for which a value field is greater than a threshold amount. The superconnector 106 may then search the updated records that were returned to determine if any of the updated records have a value field that is greater than the threshold amount. A test is then performed at optional decision block 418 based on the determination of whether any of the updated object records satisfy the filter for the user connector being processed. If at least one of the updated object records satisfies the filter, then the result of the test at optional decision block 418 is YES, and the method 400 proceeds to block 420. Otherwise, if none of the updated object records satisfy the filter for the user connector being processed, then the result of the test at optional decision block 418 is NO, and the method 400 proceeds to a continuation terminal ("terminal B") in order to skip to the end of the user connector loop. One will recognize that, if the NO branch of optional decision block 418 is taken, then the API query is skipped for the user connector being processed.

Block 416 and decision block 418 are illustrated as optional, because in some embodiments, the superconnector may not evaluate the filter in the user connector. If the filters are not evaluated, then block 416 and decision block 418 would not be performed, and the method 400 would proceed directly from for loop start block 414 to block 420.

At block 420, the user connector 106 being processed uses its user account to query the third party data source 102 via the API 112 for updated object records for the object. By using the user account (instead of the superuser account), the third-party data source 102 will provide the user connector 106 only those object records for which the user account has the permission to access. In some instances, the user connector 106 may receive an empty result from the API 112 despite the fact that the superconnector found updated object records, because the user account may not have access to any of the updated records. Upon receiving the updated object records from the API 112, the user connector 106 updates data in the sheet data store 108 according to the updated object records and the settings associated with the user connector 106.

The method 400 then proceeds to the end of the user connector loop at for loop end block 422. If any user connectors 106 that access the object being processed have not yet been processed, the method 400 moves on to the next user connector 106 and returns to for loop start block 414. Otherwise, the method 400 proceeds to the end of the object loop at for loop end block 424. If any objects have not yet been processed, the method 400 moves on to the next object and returns to for loop start block 408. Otherwise, the method 400 proceeds to the end of the polling interval loop at for loop end block 426. If the method 400 is intended to continue running, then it waits for the polling interval time and returns to the for loop start block 406. Otherwise, if the method 400 is intended to stop (for example, if a synchronization process that includes the method 400 or the entire the multi-user data service 100 is being shut down), the method 400 proceeds to an end block and terminates.

When reviewing the overall effect of the method 400, it shows clear advantages over the traditional techniques described above. In FIG. 3, the best case and the worst case for the number of API queries conducted during each polling interval were both M*N. Even if some objects were not updated (which may be highly likely for certain objects), this number of API queries would not change in the method 300.

To estimate the amount of queries generated by method 400 during a given polling interval, one can again consider both the best and worst case. In either case, the superconnector submits at least one API query for each object (so, M queries). Then, a query is executed only for the user connectors that reference objects that have been updated. Assuming, again, that N connectors reference each of the objects, then M*N additional queries would be executed, for a total of M+(M*N). While this is slightly worse than the worst case performance for FIG. 3 (which was the same as the best case performance, M*N), the number of objects (M) is expected to be relatively small and stable. In other words, while the method 400 does execute slightly more API queries in the worst case, these additional API queries do not increase as the number of connectors increases, and so the method 400 does not scale more poorly than the traditional method 300.

For anything better than the worst case, however, the dramatic benefits provided by the method 400 are evident. In a typical case in which a limited subset of the objects have been updated, the number of queries executed will be M+[(M−X)*N], where X is the number of objects that have not been updated. To illustrate the improvement compared to the (M*N) performance of method 300, the same example used above to illustrated method 300 may be considered. In the example, 10 total objects are present (M), and each object has 100 user connectors (N). In a scenario where five of the objects do not have any updates, there will be M=10 queries made by the superconnector, and then (10−5)*100 queries made by the user connectors, for a total of only 510 queries (compared to 1000 in method 300). If eight of the objects did not have any updates, then there would be 10+[(10−8)*100] queries, for a total of 210. If the filters are evaluated in optional block 416 and optional decision block 418, the number of queries for these cases may be driven down even further. In the best case scenario where none of the objects have any updates (or the updates that do exist do not match any of the filters), then there would be 10+[(10−10)*100] queries, for a total of merely 10. Given that some of the objects are likely to be rarely updated, it is clear that the use of the method 400 will provide significant reductions in the number of API queries, and thereby conserve computing power and bandwidth.

In some embodiments, the user interface 104 of the multi-user data service 100 may provide an interface that allows configuration of the polling interval. The interface may illustrate predictions of the best case, worst case, and average case of the number of API requests that will be generated per measurement period given the selected polling interval, the number of connectors 106, and the number of objects. In some embodiments, the interface may show historical API request totals in chart or graph form, as well, to help visualization of trends based on user growth. In some embodiments, the interface may use this information to predict when an API rate limit is likely to be reached, and when a polling interval should be extended. In some embodiments, the interface may allow the improved query method described in FIG. 4 to be turned on or off, for embodiments in which the improved query method may be provided for an increased cost or as an otherwise special feature.

Figure 5:
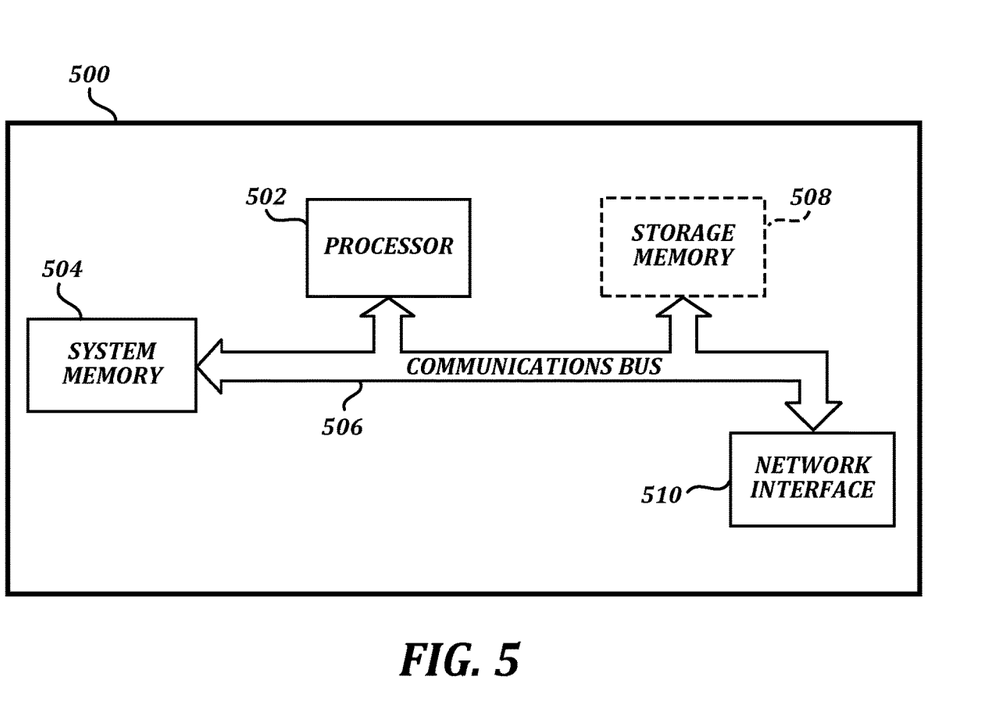
FIG. 5 is a block diagram that illustrates aspects of an exemplary computing device appropriate for use as a computing device of the present disclosure.

FIG. 5 is a block diagram that illustrates aspects of an exemplary computing device 500 appropriate for use as a computing device of the present disclosure. While multiple different types of computing devices were discussed above, the exemplary computing device 500 describes various elements that are common to many different types of computing devices. While FIG. 5 is described with reference to a computing device that is implemented as a device on a network, the description below is applicable to servers, personal computers, mobile phones, smart phones, tablet computers, embedded computing devices, and other devices that may be used to implement portions of embodiments of the present disclosure. Moreover, those of ordinary skill in the art and others will recognize that the computing device 500 may be any one of any number of currently available or yet to be developed devices.

In its most basic configuration, the computing device 500 includes at least one processor 502 and a system memory 504 connected by a communication bus 506. Depending on the exact configuration and type of device, the system memory 504 may be volatile or nonvolatile memory, such as read only memory ("ROM"), random access memory ("RAM"), EEPROM, flash memory, or similar memory technology. Those of ordinary skill in the art and others will recognize that system memory 504 typically stores data and/or program modules that are immediately accessible to and/or currently being operated on by the processor 502. In this regard, the processor 502 may serve as a computational center of the computing device 500 by supporting the execution of instructions.

As further illustrated in FIG. 5, the computing device 500 may include a network interface 510 comprising one or more components for communicating with other devices over a network. Embodiments of the present disclosure may access basic services that utilize the network interface 510 to perform communications using common network protocols. The network interface 510 may also include a wireless network interface configured to communicate via one or more wireless communication protocols, such as WiFi, 2G, 3G, LTE, WiMAX, Bluetooth, Bluetooth low energy, and/or the like. As will be appreciated by one of ordinary skill in the art, the network interface 510 illustrated in FIG. 5 may represent one or more wireless interfaces or physical communication interfaces described and illustrated above with respect to particular components of the system 100.

In the exemplary embodiment depicted in FIG. 5, the computing device 500 also includes a storage medium 508. However, services may be accessed using a computing device that does not include means for persisting data to a local storage medium. Therefore, the storage medium 508 depicted in FIG. 5 is represented with a dashed line to indicate that the storage medium 508 is optional. In any event, the storage medium 508 may be volatile or nonvolatile, removable or nonremovable, implemented using any technology capable of storing information such as, but not limited to, a hard drive, solid state drive, CD ROM, DVD, or other disk storage, magnetic cassettes, magnetic tape, magnetic disk storage, and/or the like.

As used herein, the term "computer readable medium" includes volatile and nonvolatile and removable and nonremovable media implemented in any method or technology capable of storing information, such as computer readable instructions, data structures, program modules, or other data. In this regard, the system memory 504 and storage medium 508 depicted in FIG. 5 are merely examples of computer readable media.

Suitable implementations of computing devices that include a processor 502, system memory 504, communication bus 506, storage medium 508, and network interface 510 are known and commercially available. For ease of illustration and because it is not important for an understanding of the claimed subject matter, FIG. 5 does not show some of the typical components of many computing devices. In this regard, the computing device 500 may include input devices, such as a keyboard, keypad, mouse, microphone, touch input device, touch screen, tablet, and/or the like. Such input devices may be coupled to the computing device 500 by wired or wireless connections including RF, infrared, serial, parallel, Bluetooth, Bluetooth low energy, USB, or other suitable connections protocols using wireless or physical connections. Similarly, the computing device 500 may also include output devices such as a display, speakers, printer, etc. Since these devices are well known in the art, they are not illustrated or described further herein.

While illustrative embodiments have been illustrated and described, it will be appreciated that various changes can be made therein without departing from the spirit and scope of the invention.

The embodiments of the invention in which an exclusive property or privilege is claimed are defined as follows:

1. A computer-implemented method of reducing a number of queries transmitted to an application programming interface (API) of a third-party data source, the method comprising:
   transmitting, by a computing device, a first query to the API to request updated object records for an object, wherein the first query uses first user credentials;
   receiving, by the computing device, a first set of updated object records from the third-party data source in response to the first query;
   in response to determining that the first set of updated object records is empty:
      refraining, by the computing device, from transmitting further queries to the API; and
   in response to determining that the set of updated object records is not empty:
      transmitting, by the computing device, a second query to the API to request updated object records for the object, wherein the second query uses second user credentials; and
      receiving, by the computing device, a second set of updated object records from the third-party data source in response to the second query;
   wherein the second user credentials have access to fewer object records than the first user credentials, and wherein the second set of updated object records is a subset of the first set of updated object records.

2. The method of claim 1, further comprising:
transmitting, by the computing device, a third query to the API to request updated object records for the object, wherein the third query users third user credentials; and
receiving, by the computing device, a third set of updated object records from the third-party data source in response to the third query.

3. The method of claim 2, wherein the first user credentials have access to all object records via the API, wherein the second user credentials have access to a first limited subset of object records via the API, wherein the third user credentials have access to a second limited subset of object records via the API, and wherein the second set of updated object records is different from the third set of updated object records.

4. The method of claim 2, wherein the first set of updated object records includes the second set of updated object records and the third set of updated object records.

5. The method of claim 1, further comprising repeating the transmitting of the first query using a configurable polling interval.

6. The method of claim 1, further comprising transmitting, by the computing device, a new query to the API to request updated object records for a second object different from the first object.

7. The method of claim 1, wherein transmitting the second query to the API includes determining that at least one updated object record in the first set of updated object records satisfies a filter before transmitting the second query to the API.

8. A system for providing a multi-user data service that accesses data from a third-party data source, the system comprising:
at least one computing device configured to provide a plurality of user connectors and at least one superconnector;
wherein each user connector of the plurality of user connectors is associated with at least an object accessible via an application programming interface (API) of a third-party data source and user credentials for accessing the API;
wherein the at least one superconnector is associated with at least an object accessible via the API and superuser credentials for accessing the API; and
wherein the at least one superconnector is configured to:
transmit a request for updated object records related to the object to the API using the superuser credentials; and
in response to receiving updated object records from the API in response to the request:
for each user connector of the plurality of user connectors that is associated with the object, instruct the user connector to transmit a request for updated object records related to the object to the API using the user credentials associated with the user connector;
wherein each of the user credentials of the plurality of user connectors has access to fewer than all of the object records accessible by the superuser credentials.

9. The system of claim 8, wherein the at least superconnector is further configured to, in response to receiving no updated object records from the API in response to the request, not instructing any user connectors to transmit requests to the API.

10. The system of claim 8, wherein the superuser credentials allow access to all object records related to the object via the API, and wherein the user credentials allow access to fewer than all object records related to the object via the API.

11. The system of claim 8, further comprising a sheet data store configured to store one or more sheets, wherein each sheet comprises one or more fields.

12. The system of claim 11, wherein each user connector is associated with a field of a sheet in the sheet data store.

13. The system of claim 12, wherein each user connector is configured to, in response to receiving an updated object record from the API of the third party data source, copy information from the updated object record to the associated field of the sheet.

14. The system of claim 8, wherein the plurality of user connectors includes:
a first plurality of user connectors each associated with a first object accessible via the API; and
a second plurality of user connectors each associated with a second object accessible via the API that is different from the first object.

15. The system of claim 14, wherein the at least one superconnector includes a first superconnector associated with the first object and a second superconnector associated with the second object.

16. The system of claim 15, wherein the first superconnector is configured to:
transmit a request for updated object records related to the first object to the API using the superuser credentials; and
in response to receiving updated object records related to the first object, instruct each user connector of the first plurality of user connectors and not the second plurality of user connectors to transmit a request for updated object records related to the first object to the API.

17. The system of claim 8, wherein each user connector of the plurality of user connectors is associated with a filter, and wherein instructing the user connector to transmit a request includes:
determining whether the updated object records meet conditions specified by the filter of the user connector;
in response to determining that at least one of the updated object records meets conditions specified by the filter, instructing the user connector to transmit the request for updated object records related to the object to the API; and
in response to determining that none of the updated object records meet conditions specified by the filter, preventing the user connector from transmitting the request for updated object records related to the object to the API.

18. The system of claim 8, wherein the at least one superconnector is configured to repeat the request and instruction actions after a polling interval time has elapsed.

19. The system of claim 18, wherein the polling interval time is configurable.

20. A non-transitory computer-readable medium having computer-executable instructions stored thereon that, in response to execution by one or more processors of a computing device, cause the computing device to perform actions for reducing a number of queries transmitted to an application programming interface (API) of a third-party data source, the actions comprising:
transmitting, by the computing device, a first query to the API to request updated object records for an object, wherein the first query uses first user credentials;

receiving, by the computing device, a first set of updated object records from the third-party data source in response to the first query;
in response to determining that the first set of updated object records is empty:
  refraining, by the computing device, from transmitting further queries to the API; and
in response to determining that the set of updated object records is not empty:
  transmitting, by the computing device, a second query to the API to request updated object records for the object, wherein the second query uses second user credentials; and
  receiving, by the computing device, a second set of updated object records from the third-party data source in response to the second query;
wherein the second user credentials have access to fewer object records than the first user credentials, and
  wherein the second set of updated object records is a subset of the first set of updated object records.

* * * * *